T. J. MADIGAN.
VALVE.
APPLICATION FILED DEC. 24, 1920.
1,410,205. Patented Mar. 21, 1922.
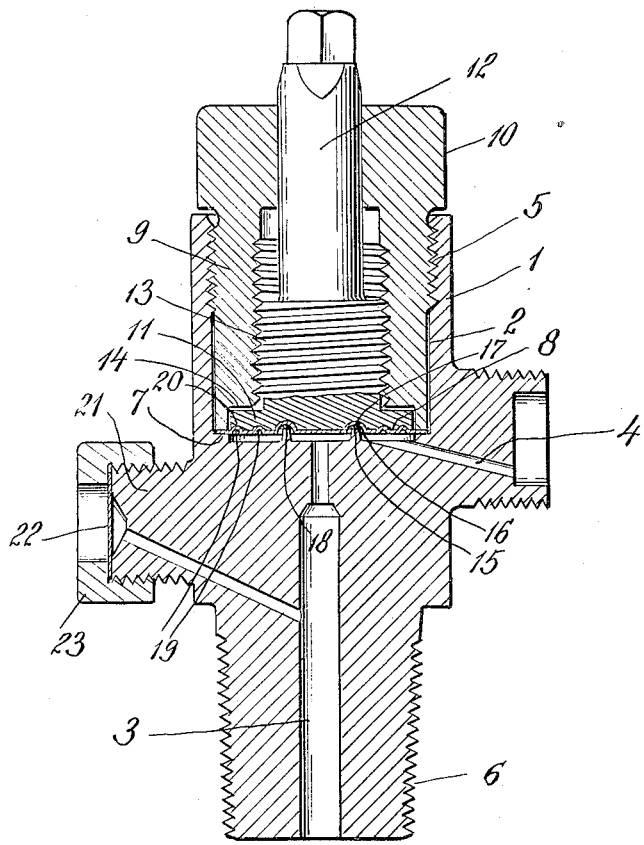
Inventor
Thomas J. Madigan
By his Attorneys
Pennie Davis Marvin & Edmonds

UNITED STATES PATENT OFFICE.

THOMAS J. MADIGAN, OF NEW YORK, N. Y., ASSIGNOR TO MADIGAN UNION CORPORATION, A CORPORATION OF DELAWARE.

VALVE.

1,410,205. Specification of Letters Patent. Patented Mar. 21, 1922.

Application filed December 24, 1920. Serial No. 432,926.

*To all whom it may concern:*

Be it known that I, THOMAS J. MADIGAN, a citizen of the United States, residing at New York, in the county of New York, State of New York, have invented certain new and useful Improvements in Valves; and I do hereby declare the following to be a full, clear, and exact description of the invention, such as will enable others skilled in the art to which it appertains to make and use the same.

My invention is an improvement in valves, and relates to that type of valve especially designed for use in connection with cylinders or "bottles" employed for storing gases under pressure, such for example as acetylene gas.

An object of the invention is to provide a valve of simple and relatively inexpensive construction, which may be readily assembled, and which in use insures against escape of the gas controlled thereby.

A further object is to provide a valve in the form of a flexible diaphragm, capable of lateral displacement and cooperating with a raised seat of annular form, together with a controlling plug for the valve movable toward and from the valve for pressing the diaphragm onto the seat.

A further object is to provide means in connection with the diaphragm, the controlling plug and the seat, for insuring a tight seal at the joint between the valve and the seat and to provide means in connection with the valve controlling plug for limiting the outward movement thereof to a point where the valve is fully opened.

In the drawings is shown a vertical section of the improved valve.

The pressures employed in storing gases, as for instance acetylene gas, in cylinders or "bottles", are relatively high, and difficulty is experienced in providing a valve, which while simple in construction and inexpensive, will insure against leakage of the gas. The gasket materials usually employed in valves for other purposes cannot be used, owing to the character of the gases, and to the rapid deterioration of such materials and other measures must be relied upon to provide a fluid tight seal.

In the present embodiment of the invention, I provide a valve comprising a body 1 chambered at one end as indicated at 2, and having at the other end a central axial inlet 3 and a lateral outlet 4. The outer end of the chamber is internally threaded as shown at 5, and the opposite end of the body is tapered and threaded as shown at 6 for connection with the cylinder or "bottle". At the inner end of the chamber 2 there is provided an annular ledge or shoulder 7 at the chamber side wall, and upon this ledge rests the edge of a disc valve 8. In practice, this valve is of phosphor-bronze, and is relatively thin, so that it is flexible and resilient.

The edge of the valve is clamped on the ledge 7 by the inner end of a sleeve or tubular member 9 which is externally threaded to engage the threads 5 and whose outer end 10 is polygonal in cross-section for engagement by a wrench or the like to remove and replace the sleeve. Thus the disc is supported as a diaphragm transversely of the chamber 2, and in spaced relation from the end of the chamber and from the inlet 3. The valve is moved to closed position by means of a head or plug 11, the said head or plug having threaded engagement with the sleeve. The inner portion of the head or plug is of a size to fit smoothly within the sleeve, and to nearly fill the same, and it has a stem 12 which passes through the sleeve, and is polygonal at its outer end for engagement by a wrench. The stem has an enlarged externally threaded portion 13 adjacent to the head, and this enlarged portion engages internal threads in the sleeve. Referring to the drawings it will be seen that the inner end of the bore of the sleeve is reamed or counter-bored as indicated at 14, and that the head or plug fits within this ream or counter-bore, filling the same. Thus the head engages the full area of the diaphragm within the clamped edge of the same.

A raised seat 15 of annular form is provided at the inlet, the said seat encircling the inlet and being of a height approximately equal to that of the ledge 7 beforementioned. The diaphragm has an annular groove 16 on its under face for receiving this seat, and the groove forms on the upper face of the diaphragm a rib. The head or plug 11 has an annular groove 17 for receiving the rib of the diaphragm, and the said grooves 16 and 17, of the diaphragm and head respectively, are of approximately the same depth, and of less depth than the height of the seat. A gasket 18 of soft metal is arranged within the groove 16 of the diaphragm, with which the seat 15 engages when the valve is closed. The making of the groove which receives the seat of less depth than the seat, enables the valve to operate properly regardless of wear on the packing. This gasket should be of material somewhat softer than that of the seat, which is usually of brass, and it should also be of metal non-oxidizable in air and not affected by the action of the gases which the valve is intended to restrain. In practice silver will be used in the construction of the gasket. The diaphragm is also provided with annular grooves or corrugations 19 on its under face forming annular ribs on its upper face, and the head or plug 11 has annular groves 20, registering with the ribs of the diaphragm, for receiving said ribs. The head or plug is limited in its movement away from the diaphragm, to a position such that the valve is fully opened by the engagement of the head with the bottom of the reamed or counter-bored portion. Thus the diaphragm is supported at all points against the pressure of the gas within the cylinder or "bottle," whether the valve is opened or closed.

The body is provided with a laterally extending externally threaded nipple 21 at the opposite side from the outlet, and the said nipple has a bore communicating with the bore of the inlet. This nipple supports a safety member, consisting of a disc 22 which is arranged over the outer end of the bore of the nipple and which is held in place by a cap ring 23 threaded onto the nipple. The disc is designed to rupture under a predetermined pressure from within, to provide escape for the confined gases, and to prevent explosion of the cylinder or "bottle."

In the operation of the improved valve, when it is desired to permit the gases to escape, the plug or head is turned in a direction to cause the same to move outwardly. The pressure on the diaphragm is relaxed, and the pressure within the "bottle" or cylinder will move said diaphragm outwardly, and the gas will pass out through the outlet. When the plug or head is turned inwardly, the diaphragm is compressed tightly against the seat at the groove 16, making a tight seal at this point, so that there can be no escape of the gas into the chamber. When the valve is opened, the pressure of the contained gases holds the same in close contact with the head, which is limited in its outward movement, to a position where the valve is fully opened, and because of such support for the diaphragm there is no danger of injury to the same from the pressure. The valve is held clamped tightly between the inner end of the sleeve and the ledge, and during the normal use of the valve it remains so held. The sleeve is only removed to permit access to the valve.

I claim.

1. In a valve of the character specified, a casing having a raised seat, a diaphragm held transversely of the casing adjacent to the seat, means for engaging the diaphragm throughout substantially its entire extent on the face remote from the seat, to move the diaphragm toward and from the seat, said diaphragm having an annular groove for receiving the seat of less depth than the height of the seat.

2. In a valve of the character specified, a body chambered at one end and having at the other end a central inlet and a lateral outlet for the chamber, a disc valve in the chamber, means adjustably connected with the body for clamping the edge of the disc to the body with the disc spaced from the inner end of the chamber and the inlet opening and forming a diaphragm extending transversely of the chamber, the body having an annular raised seat encircling the inlet, and a controlling head or plug for the valve adjustable with respect to the body toward and from the valve for clamping the valve to the seat, said disc having an annular groove for receiving the seat and a gasket of metal within the groove.

3. In a valve of the character specified, a body chambered at one end and having at the other a central inlet and a lateral outlet, a disc valve in the chamber, means for clamping the disc edge to the body with the body of the disc spaced from the inner end of the chamber, a valve controlling head adjustable with respect to the body toward and from the disc, the body having a raised seat encircling the inlet against which the disc is clamped by the head, and the disc having a groove of less depth than the height of the seat for receiving the seat.

4. In a valve of the character specified, a body chambered at one end and having at the other a central inlet and a lateral outlet, a disc valve in the chamber, means for clamping the disc edge to the body with the body of the disc spaced from the inner end of the chamber, a valve controlling head adjustable with respect to the body toward and from the disc, the body having a raised seat encircling the inlet against which the disc is clamped by the head, said head engaging the disc throughout the area within the clamping edge, the head and the disc having interengaging grooves and ribs, one pair of interengaging ribs and grooves registering with the seat, and being of less depth than the height of the seat.

5. In a valve of the character specified, a casing having an inlet and an outlet, and a raised seat encircling the inlet, a diaphragm held transversely of the casing adjacent to the seat, and having a groove for receiving the seat, and a gasket within the groove, and means adjustable with respect to the casing and engaging substantially the entire area of the face of the diaphragm remote from the seat for pressing the diaphragm toward the seat.

In testimony whereof I affix my signature.

THOMAS J. MADIGAN.